(12) United States Patent
Fetcenko et al.

(10) Patent No.: US 6,593,024 B2
(45) Date of Patent: Jul. 15, 2003

(54) HYDROGEN STORAGE BATTERY AND METHODS FOR MAKING

(75) Inventors: Michael A. Fetcenko, Rochester, MI (US); Kwo Young, Troy, MI (US); Cristian Fierro, Northville, MI (US)

(73) Assignee: Ovonic Battery Company, Inc., Troy, MI (US)

(*) Notice: Subject to any disclaimer, the term of this patent is extended or adjusted under 35 U.S.C. 154(b) by 0 days.

(21) Appl. No.: 10/176,240

(22) Filed: Jun. 20, 2002

(65) Prior Publication Data

US 2003/0054228 A1 Mar. 20, 2003

Related U.S. Application Data (60) Provisional application No. 60/302,131, filed on Jun. 29, 2001.

(51) Int. Cl.⁷ .......................... H01M 10/34; H01M 6/00
(52) U.S. Cl. ..................... 429/60; 429/218.2; 429/223; 429/232; 29/623.1
(58) Field of Search ...................... 429/60, 223, 218.2, 429/232; 29/623.1

(56) References Cited

U.S. PATENT DOCUMENTS

| | | | | |
|---|---|---|---|---|
| 4,935,318 A | * | 6/1990 | Ikoma et al. | 29/623.5 |
| 6,348,284 B1 | * | 2/2002 | Bernard et al. | 429/206 |
| 2002/0064709 A1 | * | 5/2002 | Ovshinsky et al. | 429/218.2 |

* cited by examiner

Primary Examiner—Laura Weiner
(74) Attorney, Agent, or Firm—Dean B. Watson; Marvin S. Siskind

(57) ABSTRACT

A hydrogen storage battery with improved cycle life and a method for making the same. The battery has a negative electrode with an electrochemically active negative material and a negative electrode capacity and a positive electrode electrochemically coupled with the negative electrode, the positive electrode having a positive electrode capacity and an electrochemically active positive material with a precharge.

Also described herein is a positive electrode material for a hydrogen storage battery and a method for making the same. The positive electrode material includes a preoxidized positive active material which is partially non-oxidized. The preoxidized material may be used to provide a precharge to the positive electrode.

27 Claims, 3 Drawing Sheets

HYDROGEN STORAGE BATTERY AND METHODS FOR MAKING

CROSS-REFERENCE TO RELATED APPLICATIONS

The present invention relates to, and is entitled to the benefit of the earlier filing date and priority of, U.S. Provisional Patent Application No. 60/302,131, filed Jun. 29, 2001, the disclosure of which is hereby incorporated by reference.

BACKGROUND OF THE INVENTION

I. Field of the Invention

The present invention pertains to rechargeable hydrogen storage batteries and methods for making the same. More particularly, the present invention pertains to rechargeable hydrogen storage batteries having a negative electrode with an active hydrogen storage material and a nickel positive electrode.

II. Description of the Background

Rechargeable batteries with high energy density, high capacity and long cycle life are highly desirable. Two types of alkaline rechargeable batteries commonly used are the Ni—Cd (nickel cadmium) type and the Ni-MH (nickel metal hydride) type. In both types of batteries the positive electrodes are made with an active nickel hydroxide material while the negative electrodes are different.

Ni-MH cells operate by a very different mechanism than Ni—Cd cells. Ni-MH cells utilize a negative electrode that is capable of reversible electrochemical storage of hydrogen, hence the term hydrogen storage battery. The negative and positive electrodes are spaced apart in an alkaline electrolyte. Upon application of an electrical potential across a Ni-MH cell, the active material of the negative electrode is charged by the electrochemical absorption of hydrogen and the electrochemical discharge of a hydroxyl ion, as shown in equation 1.

$$M + H_2O + e^- \leftrightarrow M-H + OH^- \quad (1)$$

The negative electrode half-cell reactions are reversible. Upon discharge, the stored hydrogen is released to form a water molecule and release an electron through the conduction network into the battery terminal.

The reactions that take place at the positive electrode of the Ni-MH cell are shown in equation 2.

$$Ni(OH)_2 + OH^- \leftrightarrow NiOOH + H_2O + e^- \quad (2)$$

The use of nickel hydroxide as a positive active material for Ni-MH batteries is generally known. See for example, U.S. Pat. No. 5,523,182, issued Jun. 4, 1996 to Ovshinsky et al., entitled "Enhanced Nickel Hydroxide Positive Electrode Materials For Alkaline Rechargeable Electrochemical Cells", the disclosure of which is herein incorporated by reference. In U.S. Pat. No. 5,523,182, Ovshinsky et al. describes a positive electrode material comprising particles of nickel hydroxide positive electrode material and a precursor coating of a substantially continuous, uniform encapsulant layer precipitated on the particles to increase conductivity and resistance to corrosion products.

Several forms of positive electrodes exist at present and include: sintered, foamed, and pasted type electrodes. Sintered electrodes are produced by depositing the active material in the interstices of a porous metal matrix followed by sintering the metal. Foamed and pasted electrodes are made with nickel hydroxide particles in contact with a conductive network or substrate, most commonly foam nickel or perforated stainless steel coated with nickel. Several variants of these electrodes exist and include plastic-bonded nickel electrodes, which may utilize graphite as a micro-conductor, and pasted nickel fiber electrodes, which utilize nickel hydroxide particles loaded onto a high porosity, conductive nickel fiber or nickel foam. The current trend has been away from using sintered electrodes in favor of pasted electrodes because pasted electrodes can provide significantly higher loading.

Several processes for making positive electrodes are also generally known, see for example U.S. Pat. No. 5,344,728 issued to Ovshinsky et al., the disclosure of which is herein incorporated by reference, where electrodes having a capacity in excess of 560 mAh/cc are reported. The particular process used for making electrodes can have a significant impact on the electrode's performance. For example, conventional sintered electrodes may now be obtained with an energy density of 480–500 mAh/cc. Sintered positive electrodes are constructed by applying a nickel powder slurry to a nickel-plated, steel base followed by sintering at high temperature. This process causes the individual particles of nickel to weld at their points of contact, resulting in a porous material that is approximately 80% open volume and 20% solid metal. The sintered material is then impregnated with active material by soaking it in an acidic solution of nickel nitrate, followed by conversion to nickel hydroxide in a reaction with alkali metal hydroxide. After impregnation, the material is subjected to electrochemical formation. Pasted electrodes may be made by mixing various powders, such as nickel hydroxide particles, material, binders and additives and applying the mixture to a conductive grid.

Production of nickel hydroxide particles is generally known and is typically made using a precipitation reaction, such as the one described in U.S. Pat. No. 5,348,822, issued to Ovshinsky et al., the disclosure of which is herein incorporated by reference. In U.S. Pat. No. 5,348,822, Ovshinsky et al describes producing nickel hydroxide material by combining a nickel salt with a hydroxide to precipitate nickel hydroxide. Like electrode formation, the method for making nickel active material can have a significant impact on properties and performance of the electrode.

Nickel hydroxide material should have high capacity and long cycle life. Excellent results have been found by forming nickel hydroxide with an apparent density of 1.4–1.7 g/cm³, a tap density of about 1.8–2.3 g/cm³, and an average size range of about 5–50μ. Excellent results have also been found by making the active, nickel hydroxide with a high packing density and a narrow size distribution, such as may be provided with substantially spherical particles having an average particle size of about 10 μm and a tap density of about 2.2 g/cc. Paste made with this kind of active material has good fluidity and uniformity, making it possible to fabricate high capacity, uniformly loaded electrodes. The use of this kind of active material also improves utilization and discharge capacity. However, if process conditions are not carefully controlled, the resulting precipitate may be irregular in shape and have a low tap density. Electrodes formed with low-density nickel hydroxide will lack high capacity and high energy density. Improper process conditions can also produce a powder that is too fine. An very fine powder will increase adsorption of water at the surface of the particles, thereby requiring longer filtering times. Further, if process conditions are not properly controlled, precipitated particles may be formed with an excessively wide particle size distribution (ranging from 1 to hundreds of microns). Nickel hydroxide made with an excessively wide particle size distribution may require additional processing, such as pulverization, to render it useful. For these reasons and others, active powder having a low density, irregular shape and/or poor size distribution is undesirable for use in a high capacity nickel metal hydride battery.

To produce high density, substantially spherical nickel hydroxide powder, carefully controlled process conditions are used to seed and gradually grow nickel hydroxide particles. Although process conditions can vary, generally the process involves combining a nickel salt with an ammonium ion to form a nickel-ammonium complex. The nickel-ammonium complex is then broken down, typically with caustic, to gradually precipitate nickel hydroxide. However, this reaction rate is difficult to control, so methods have been introduced to separate certain steps in the production process. For example, U.S. Pat. No. 5,498,403, entitled "Method for Preparing High Density Nickel Hydroxide Used for Alkali Rechargeable Batteries", issued to Shin on Mar. 12, 1996, the disclosure of which is herein incorporated by reference, discloses a method for preparing nickel hydroxide from a nickel sulfate solution using a separate or isolated amine reactor. Nickel sulfate is mixed with ammonium hydroxide in the isolated amine reactor to form a nickel ammonium complex. The nickel ammonium complex is removed from the reactor and sent to a second mixing vessel or reactor where it is combined with a solution of sodium hydroxide to obtain nickel hydroxide. The nickel hydroxide particles may then be formed into a pasted electrode with suitable binders, additives, conductive powders, etc. The electrode is then combined with a negative electrode, separator and a suitable electrolyte to form a hydrogen storage battery.

One useful form of hydrogen storage battery is the sealed type. Sealed batteries are particularly advantageous because they are maintenance free. Sealed batteries typically use a small amount of liquid and operate in a starved condition. However, sealed hydrogen storage batteries are vulnerable to degradation during cycling, particularly, during over-charging and overdischarging conditions. For example, overcharging can effect oxidization of the negative active material. Oxidation of the negative active material it turn results in an irreversible loss of negative electrode capacity and an unbalanced state of charge between the positive electrode and the negative electrode. Another problem that can occur is battery venting. Battery venting can occurs primarily from pressure build-up resulting from hydrogen gas generation at a rate that cannot be recombined within the battery at a complimentary rate. When a critical pressure is reached, gas is vented through a battery safety valve. Most of this excess gas evolution occurs during overcharging at the surface of the negative electrode. To further add to the problem, additional hydrogen evolution may occur from localized heating of the negative electrode. Localized heating occurs from the exothermic reaction of oxygen gas recombining with hydrogen stored at the negative electrode. This localized heating in turn lowers the hydrogen evolution potential at the surface of the negative electrode. The end result is build-up and venting of hydrogen gas. This gas venting causes an irreversible loss of cell capacity and an increase in cell impedance.

To reduce the potential for oxidation of the negative active material and minimize gas evolution, current practice is to make hydrogen storage batteries that are positive limited, e.g. have a positive electrode capacity which is smaller than negative electrode capacity. Excess negative capacity prevents the negative electrode from becoming fully charged and ideally permits oxygen produced at the positive electrode to easily recombine at the surface of the negative electrode according to the following reactions:

$$OH^- \rightarrow \frac{1}{4}O_2 + \frac{1}{2}H_2O + e^- \text{ (at the positive electrode)} \quad (5)$$

$$MH + \frac{1}{4}O_2 \rightarrow M + \frac{1}{2}H_2O \text{ (at the negative electrode)} \quad (6)$$

However, positive limiting a battery alone does not prevent premature failure due to complications during overcharge, overdischarge and charging. As a consequence of these complications, oxidation and gas evolution at the negative electrode act to systematically reduce battery cycle life through electrode oxidation, degradation, battery venting, active material disintegration, etc.

SUMMARY OF THE INVENTION

To address the above mentioned problems and others, the present invention provides a hydrogen storage battery having an overcharge reservoir, an overdischarge charge reservoir and a designed balance between the overcharge reservoir and the overdischarge reservoir to improve cycle life. The designed balance may be provided by adding a preoxidized positive active material to the positive electrode in an amount sufficient to balance excess negative electrode capacity between the overcharge reservoir and overdischarge reservoir.

The present invention also provides a preoxidized positive active material for a positive electrode of a hydrogen storage battery for balancing the overcharge reservoir and the overdischarge reservoir. The preoxidized positive active material includes a plurality of partly oxidized particles having a sustained discharge capability.

The present invention also provides a method for making preoxidized active material. The method includes forming active particles with a partly oxidized bulk without a fully oxidized surface.

The present invention also provides a method for making a rechargeable electrochemical hydrogen storage battery with improved cycle life by balancing the pre-activation charge between the positive electrode and the negative electrode.

For a more complete understanding of the present invention, reference is now made to the following detailed description and accompanying drawings.

DETAILED DESCRIPTION OF PREFERRED EMBODIMENTS

The hydrogen storage battery of the present invention includes a negative electrode with a negative electrode capacity; a positive electrode with a positive electrode capacity, an electrolyte, an overcharge reservoir, an overdischarge reservoir; wherein the overcharge reservoir and the overdischarge reservoir are balanced to provide improved cycle life.

The negative electrode preferably includes one or more electrochemical negative active materials selected from the group of hydrogen storage alloys including AB2, modified AB2, TiZrVNiCr, modified TiVNiZr materials, AB5, modified AB5, and other $AB_x$, materials.

The positive electrode is preferably a non-sintered nickel electrode having a plurality of preoxidized active material particles. The preoxidized particles preferably include nickel hydroxide and nickel oxyhydroxide. The preoxidized particles may also include cobalt hydroxide and cobalt oxyhydroxide.

The hydrogen storage battery is preferably positive limited, e.g. the negative active material is provided with excess capacity in relation to the positive active material. The excess negative capacity has two primary functions: to provide an overcharge reservoir for preventing high pressure generated during charge and overcharge, and to provide an overdischarge reservoir for protecting the negative electrode from oxidation during forced overdischarge. The ratio of negative capacity to positive capacity (or n/p ratio) is preferably greater than 1.0. The n/p ratio is preferably less than 3.0, preferably less than 2.0, more preferably less than 1.8 and more preferably less than 1.5. A preferred n/p ratio is 1.1 to 2.0. By balancing between cell capacity and cycle life performance, a preferred n/p ratio can be obtained. Further, by fixing the relative ratio of negative capacity to positive capacity, oxygen/hydrogen recombination at the negative electrode may be achieved with substantially no net pressure increase during low rate overcharge, i.e. at a charge rate of less than 0.1 C. Further, it may also be expected that substantially no net pressure increase will occur during forced low rate overdischarge, as hydrogen gas generated at the positive electrode may be absorbed at a complementary rate by the negative electrode.

It has been found that positively limiting a battery alone, does not adequately consider the distribution of capacity between the overcharge reservoir (extra negative electrode capacity during overcharge) and overdischarge reservoir (extra negative electrode capacity during overdischarge). It has also been found that improper reservoir balance may detrimentally effect cycle life. Improper reservoir balance can occur when oxidizable additives, such as Co and CoO, are added to the positive electrode to form a conductive network. Poor reservoir balance can also occur during irreversible formation of Ni to a higher than 3+ oxidation state. In such cases charge balance between the positive and negative electrode is detrimentally altered through a one time charge of the negative electrode. The one time charge reduces the amount of negative electrode overcharge reservoir or "OCR". The loss in OCR, in turn, reduces the ability of the battery to recombine hydrogen, leading to eventual cell failure. By properly balancing capacity between the overcharge reservoir and overdischarge reservoir, improved cycle life can be obtained.

The positive electrode preferably includes at least one electrochemically non-active additive to improve conductivity, corrosion resistance, active material utilization, cycle life, etc. During initial charging, some of these electrochemically non-active additives will oxidize before nickel hydroxide. The oxidation of these additives, while not electrochemically reversible, provide a corresponding one time charge to the negative active material. These additives do not add capacity, yet result in altering the distribution of OCR and over discharge reservoir (ODR) in the negative electrode. However, it has been found that oxidizing the additives after electrode formation and even after cell formation provides a substantial benefit. For example, nickel hydroxide is an essentially non-conductive material. To improve conductivity Co-additives, such as Co, CoO, are mixed with nickel hydroxide particles. During initial cell cycling the additives may dissolve and precipitate to integrally form a conductive CoOOH network about the nickel active material, thereby greatly enhancing conductivity. It is believed that preoxidizing these additives prior to initial cell cycling may prohibit this integral formation. To overcome the net charge reduction in the positive electrode in favor of the negative electrode and permit formation of the conductivity network a compensating 'positive precharge' may be added to the battery. By compensating for the one time charge to the negative active material during irreversible oxidization of the additives to reduce the loss of overcharge reservoir occurring during initial cycling, loss of overcharge reservoir occurring during initial cycling can be substantially reduced. The benefits are increased cycle life to 400, 500, 600 or more and reduced requirements in the amount of excess negative capacity, which in turn raises the usable cell capacity.

Figure 3:
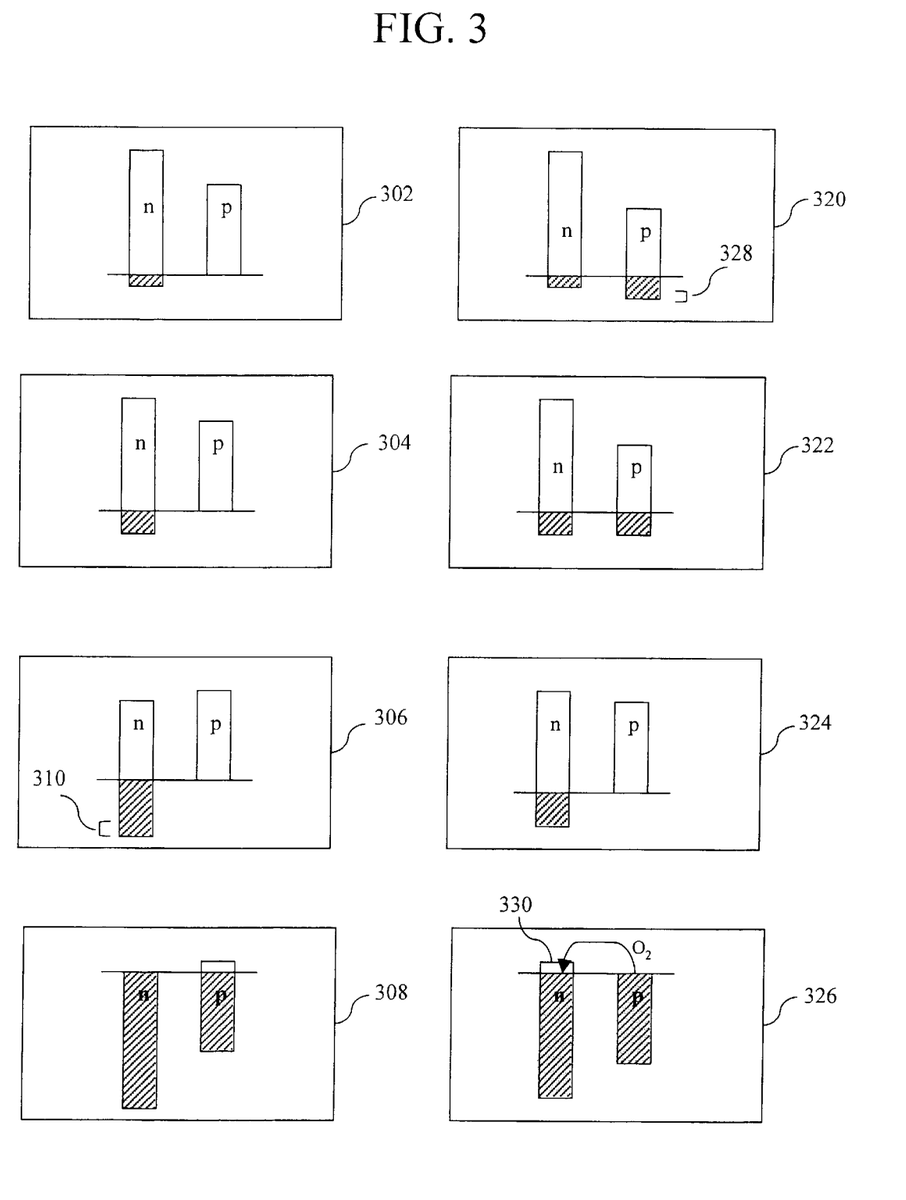
FIG. 3 is an comparison view of a conventional hydrogen storage cell with a balanced hydrogen storage cell in accordance with the present invention.

Referring now to FIG. 3, depicted therein is a comparison of various stages of battery life between a hydrogen storage cell without balancing charge (302–308) and one with balancing charge (320–326). Each stage 302–308 and 320–326 shows a positive electrode (p), a negative electrode (n) and the amount of charge from active material in each electrode. The amount of charge is represented by crosshatching and the amount of available capacity is represented without crosshatching. It should be evident from the figure that the charge distribution varies at different stages in battery life. For example, immediately after battery assembly, a cell without balancing 302 is positive limited with a negative charge but no net positive charge from active material, while a cell with balancing 318 has both a negative precharge and a positive precharge. The cell with balancing also has a net positive charge when comparing the positive and negative active materials. The assembled cells 302, 320 are then subjected to formation.

Formation is used to activate the cell. Formation may be carried out by any process that prepares the negative active material and the positive electrode for routine battery use. Formation may be carried out by heat formation, electrical formation, or both. Heat formation is the process of heating the cell to prepare it for use. Heat formation operates to activate a battery by removing oxide layers of the negative active material, such as the native oxide layer found in $AB_2$ or $AB_5$ hydrogen storage materials, and may also act to dissolve certain additives in the positive electrode, such as Co. Heat formation may also form catalytic regions throughout the surface oxide of certain hydrogen storage alloys, which acts to improve charge and discharge rate capability. Heat formation may be carried out by heating a cell at about 60° C. for about five days or less, and more preferably two days or less. The conditions of temperature and time may, of course, vary depending upon the active materials used and the additives of both the negative electrode and positive electrode. In the cell without balancing 304, heat formation results in a unbalanced charge distribution between the negative and positive electrodes. This unbalanced charge distribution results in a corresponding reduction in overcharge reservoir. Sources of the unbalanced charge distribution include irreversible oxidation of Co-containing additives in the positive electrode; oxidation of newly formed negative electrode surfaces; formation of higher oxidation γ-state positive active material; oxidation of the separator, etc. Much of the increase in negative charged material, if not all, becomes wasted material 310. During overcharge 308, the overcharge reservoir may become depleted and the negative electrode fully charged. With further charging, the negative electrode starts to release hydrogen and increases cell pressure. In comparison, a cell produced with balancing 320 has a positive charge which is substantially the same as the negative charge after heat formation. Balancing provides a cell having a positive precharge (the difference between 322 and 324) in an amount effective to offset, or substantially offset, the irreversible charging of the negative material during formation and/or during initial cycling. The activated cell 324 is therefore left with a greater available charge capacity than the positive electrode to avoid depletion of the overcharge reservoir. In use and during overcharge, the cell with balancing 426 is left with an overcharge reservoir 430 in an amount effective for recombining oxygen generated at the positive electrode with hydrogen at the negative electrode to produce water without excessive cell pressure leading to venting.

The battery may also be subjected to electrical formation. Electrical formation is the process of charging and discharging the cell a number of times to activate or fully activate the cell. Depending on the alloy, electrical formation may be used in conjunction with heat formation to reduce the number of cycles necessary for activation. For example, without heat formation a battery may require 20 or more cycles for activation, while a battery with heat formation may require 3 or less cycles for activation. As shown 306, 324, upon electrical formation, the battery without a positive precharge 306 undergoes a substantial reduction in available negative capacity over that of the cell with balancing 324, due to a one time, irreversible charging of the negative material as described above.

As an illustration, the charge distribution after cell assembly and total theoretical excess negative capacity within the cell, may be calculated as follows:

Excess Negative Capacity=Theoretical Capacity×Negative Active Material Weight−Theoretical Capacity×Positive Active Material Weight.

| | |
|---|---|
| Negative active material | 22 g |
| Negative energy density | 315 mAh/g |
| Negative capacity | 6950 mAh |
| Positive active material | 19 g |
| Positive energy density | 245 mAh/g |
| Positive capacity | 4655 mAh |
| Extra negative capacity (sum of overcharge and overdischarge reservoir) | 2295 mAh |
| Co2+ co-precipitated in positive active material (8%) | 0.96 g |
| Co2+ added in paste as CoO (6%) | 0.90 g |
| Co added in paste as Co metal (5%) | 0.95 g |
| Amount of pre-charge generated from oxidizing Co into Co3+* | 845 mAh |
| Amount of pre-charge generated from oxidizing Co into Co3+** | 1296 mAh |
| Total pre-charge generated from non-reversible oxidizing positive electrode | 2141 mAh |
| Maximum overcharge reservoir | 154 mAh |

*2 Co + 4 H$_2$O → 2 CoOOH + H$_2$ (g)
**2 CoO + 2 H$_2$O → 2 CoOOH + H$_2$ (g).

As shown above, the overcharge reservoir is only 3% or less of cell capacity for a conventional battery. With a reduction from oxidation, no overcharge reservoir will be available during overcharge conditions.

Figure 4:
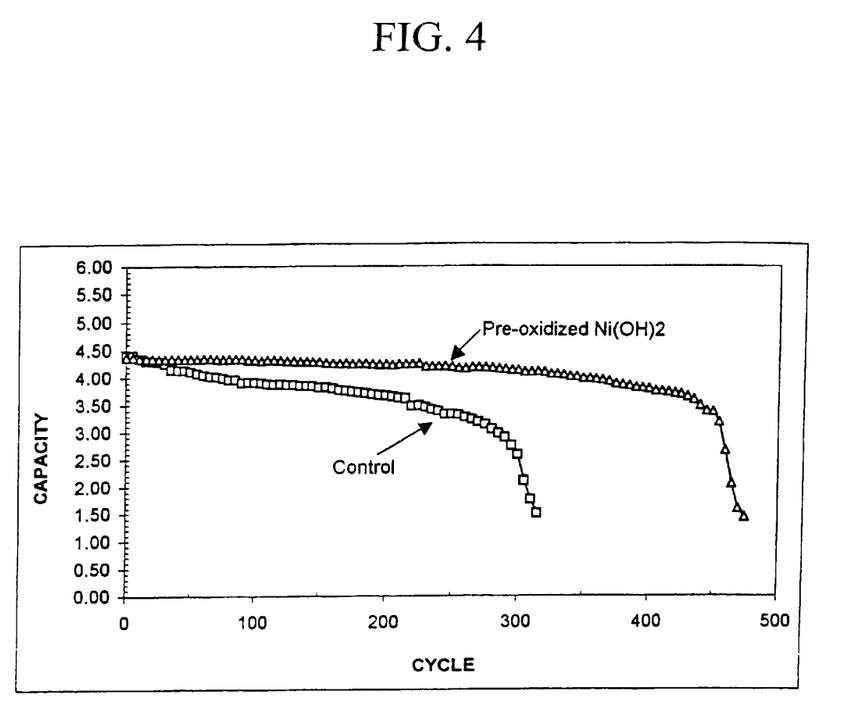
FIG. 4 shows a comparison between a control sample and a sample prepared in accordance with the present invention.

As an example of the above, FIG. 4 shows a positive electrode and negative electrode at various stages of cell development, the stages of which include: after assembly, after thermal activation and after electrical formation. As shown, the negative electrode can have a thick native oxide after assembly. Thermal activation reduces the native oxides, such as Zr oxides and Ti oxides, to enhance the hydrogen absorption capability and catalytic activity of the material. Thermal activation may also provide a microporous, catalytic oxide surface. At the positive electrode, CoO and Co added during assembly is oxidized to Co2+ and dissolves in solution. Upon electrical formation the Co2+ precipitates about the positive electrode material to form a CoOOH coating, thereby enhancing conductivity. Electrical formation also provides enhanced activity to the negative electrode active material by providing fine cracks and a high surface area.

In accordance with a preferred embodiment of the present invention, the charge between the negative electrode and the positive electrode may be balanced by adding a preoxidized positive active material to the positive electrode. Preoxidized positive active material is electrochemically active positive electrode material that is oxidized prior to battery cycling, and preferably prior to cell integration. The preoxidized positive active material preferably includes preoxidized nickel hydroxide.

The terms nickel hydroxide and nickel hydroxide material, as used throughout the ensuing disclosure, are interchangeable terms used to define electrochemically active nickel hydroxide generally exemplified by the equation NiM(OH)$_2$, where M may be none, one, two, three, four, five or more modifiers. The modifiers may be chemical or compositional modifiers. Modifiers, when present, are added in amounts sufficient to improve various performance characteristics of the active material, such as cycle life, charge efficiency, low temperature performance, high temperature performance, power, utilization, etc. These modifiers may be as high as 20 atomic % of the total metal composition. Modifiers provided in amounts higher than 20% tend to reduce capacity below otherwise desirable levels. Preferred modifiers include elements selected from the group consisting of Al, Ba, Bi, Ca, Co, Cr, Cu, F, Fe, In, K, La, Li, Mg, Mn, Na, Ru, Sb, Sn, Sr, Ti, rare earth elements, and Zn. The term nickel hydroxide also includes composite nickel hydroxide, such as multi-layered nickel hydroxide materials, coated nickel hydroxide materials, nickel hydroxide materials having embedded metal particles, etc. Likewise, the term nickel oxyhydroxide, as is used herein, includes any nickel oxyhydroxide material generally exemplified by the equation NiM(OOH), where M may be none, one, two, three, four, five or more modifiers.

Examples of nickel hydroxide formulations which may be preoxidized in accordance with the present invention include those described in U.S. Pat. Nos. 5,523,182; 5,348,822; 5,344,728; and 6,019,955, the disclosures of which are herein incorporated by reference. For further examples of nickel hydroxide materials applicable to the present invention, see also commonly assigned, co-pending U.S. patent application Ser. No. 09/135,460, entitled "Composite Positive Electrode Material and Method for Making Same" filed Aug. 17, 1998, now U.S. Pat. No. 6,177,210. Disclosed therein is a composite positive electrode material for use in electrochemical cells. The composite material comprises nickel hydroxide particles having a conductive material at least partially embedded within. The embedded material is preferably a conductive metal embedded within the bulk. Preferred positive active materials are substantially spherical, high density, preoxidized nickel hydroxide particles having one or more modifiers.

The preoxidized positive active material is preferably partly oxidized. A partly oxidized positive active material reduces reactivity and permits a slower more controlled reaction that reduces heat generation, improves safety and optimizes charge balancing. The preoxidized positive active material is preferably greater than 1% oxidized. The preoxidized active positive material is preferably 80% or less oxidized, is more preferably 3 to 70% oxidized, is more preferably 5 to 55% oxidized. A most preferred material is 10 to 70% oxidized, is more preferably 20 to 60% oxidized and is more preferably 30 to 55% oxidized.

Figure 2A:
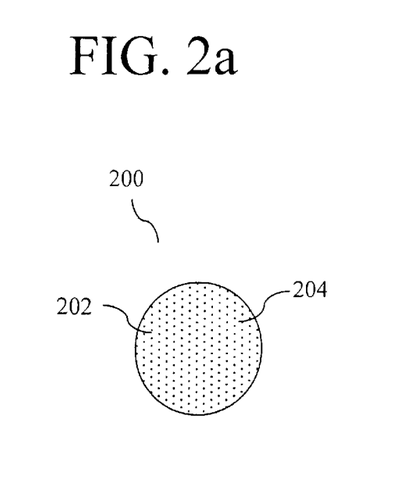
FIG. 2a is a cross-sectional view of a preoxidized positive active material in accordance with the present invention.

The preoxidized positive active material is preferably a plurality of partially preoxidized nickel hydroxide particles. The particles preferably have an average particle size of 5 to 50 $\mu$m. The preoxidized particles are preferably substantially spherical. Substantially spherical, preoxidized particles with an average particle size of 5 to 50 $\mu$m allow formation of pasted positive electrodes having high energy density and increased overcharge reservoir stability. The partially preoxidized particles may include: a solid solution of oxidized and non-oxidized active material; layers of oxidized and non-oxidized material; a heterogeneous microcrystalline mixture of oxidized and non-oxidized active material, or a combination of two or more of the above. As referred to herein, microcrystalline materials have a grain size of 50 to 150 angstroms. Referring now to FIG. 2a, shown therein is a partially oxidized particle 100 in accordance with a preferred embodiment. Preferably the partially oxidized particle includes a substantially uniform dispersion of oxidized 104 and non-oxidized 102 active material. Preoxidized particles that contain a dispersion of oxidized and non-oxidized material are suitable for delivering a level charge over an extended period of time.

The preoxidized particles are preferably greater than 1% oxidized and less than 75% oxidized. The particles are more preferably 3 to 50% oxidized, more preferably 8 to 35% oxidized and more preferably 8 to 20% oxidized.

Figure 2B:
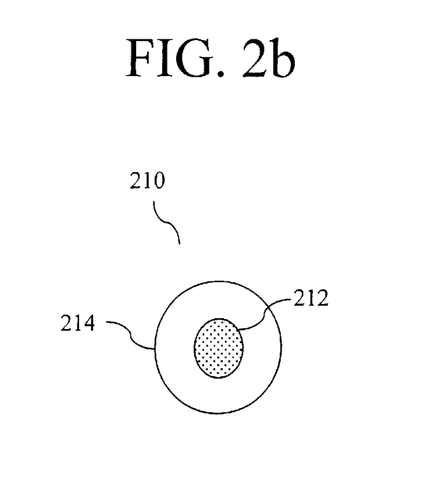
FIG. 2b is a cross-sectional view of a preoxidized positive active material in accordance with the present invention.

Referring now to FIG. 2b, shown therein is a partially oxidized particle 210 in accordance with another preferred embodiment. The particle preferably has a partially to fully non-oxidized surface 214. The surface 214 is preferably less the 98% oxidized, more preferably less than 50% oxidized, and more preferably 25% of less oxidized. The surface is preferably 3% to 98% non-oxidized, is more preferably 5% to 75% non-oxidized, and most preferably 75% to 95% non-oxidized. A partially non-oxidized surface provides a reduced rate of charge delivery, which has been found to be particularly advantageous during electrode formation where extreme heat may be generated when mixing preoxidized active material with various electrode additives and/or binders. By having a non-oxidized, to partially oxidized surface, excessive heat generation during paste mixing or electrode formation can be alleviated. The non-oxidized surface may also be advantageous in maintaining a higher degree of charge until initial battery cycling has begun. The particle preferably has a partially oxidized bulk and/or core 112. The bulk and/or core 112 is preferably 1% to 100% oxidized, more preferably 3% to 35% oxidized, more preferably 5% to 25% oxidized, and more preferably 8% to 20% oxidized. The core may be considered separate from the bulk and oxidized to a different degree than the bulk. The core may therefore be fully oxidized, while the bulk is less than 99% oxidized, or oxidized to a preferred degree as listed above.

The preoxidized particles are preferably formed in a non-sintered or pasted electrode. The pasted electrode may be made by mixing the preoxidized material with various additives and/or binders and applying the past to a conductive support. Additional, non-oxidized positive active material may also be blended with the mixture. Preferably, one or more cobalt additives are added to the pasted electrode. The cobalt additives may include Co and/or CoO to enhance conductivity, improve utilization and reduce electrical resistance of the positive electrode.

Sample

Two c-cells were prepared, one having conventional nickel hydroxide the control) and one having pre-oxidized nickel hydroxide.

The control size-C cell was made from dry compacted negative electrode with transition metal based Laves-phase $AB_2$ hydrogen storage material, a pasted $(Ni, Co, Zn)(OH)_2$ positive electrode with 5% Co and 6% CoO additives, 30% KOH as electrolyte, and PP/PE grafted non-woven fabric as separator. The positive electrode was prepared directly from the paste mixture of the virgin (un-oxidized)(Ni, Co,Zn)(OH)2 spherical powder, Co, CoO, and binder material. The nominal capacity of the cell is 4.5 Ah.

A "pre-oxidized positive" size-C cell was made from the same components as the control cell except the $(Ni, Co, Zn)(OH)_2$ spherical powder used as the positive active material was formed through a pre-oxidation process. The oxidation condition was 3 hours immersion in 5.5 wt. % hypochlorate solution at room temperature. The amount of pre-charge is 50% of the reversible part of the capacity. The rest of the battery construction was identical to the control cell.

Cycle life testing was conducted using a 96 channel Maccor Gen 4 Battery Test System. The tester consists of 96 independently controlled channels capable of 0 to +5 Volts and 12.5 amps of current both in charge and discharge. The Maccor Battery Tester monitors cell voltage to determine the peak charge voltage value. When the tester has detected a negative voltage inflection of 3 mV from the peak value, charge is terminated. The cells are connected to individual channels and cycled using C/2 charge to $-\Delta V$ cutout. The cell is then discharged using a C/2 rate to a cutout of 0.9 Volts. Cells are continuously cycled (approximately 5 cycles/day) using this method until it has been determined that the cell has dropped to less than 70% of its original capacity.

The cycle life results are plotted in FIG. 4. As can be seen from the plot of cycle vs. capacity, the battery having pre-oxidized nickel hydroxide material has significantly improved cycle life.

Preoxidized positive active material may be made by any suitable method. Preoxidized positive active material is preferably made by exposing nickel hydroxide material to an oxidizing agent for a time and temperature suitable for substantial, but less than total, oxidation. Hence, oxidizing conditions are preferably more than that merely provided by exposure to air or ambient conditions and less than full oxidation. Preferably, oxidation provides a partially to fully non-oxidized surface, and a partly oxidized bulk and/or core. Preferably oxidation provides a substantially even dispersion of oxidized and non-oxidized active material throughout the particle.

A preferred method for making a partly preoxidized positive active material includes forming the active material in the presence of an oxidizing agent. Another method for making a partly preoxidized positive active material includes forming an oxidized active material core or inner portion and encapsulating the inner portion with a active material with a different degree of oxidation. A variation of this may be to form a seed, which later becomes the inner portion of a particle. The inner portion may then be partly or fully oxidized and the outer portion around the inner portion may be non-oxidized or partially non-oxidized, thereby providing a particle with two or more degrees of oxidation. The inner and outer portions may have the same chemical compositions or may be different compositions. Providing particles with more than one active material and multiple degrees of oxidation allows one to take advantage of both the surface and bulk properties of the particle in order to separately optimize catalytic activity, active material utilization, cycle life, etc.

Figure 1:
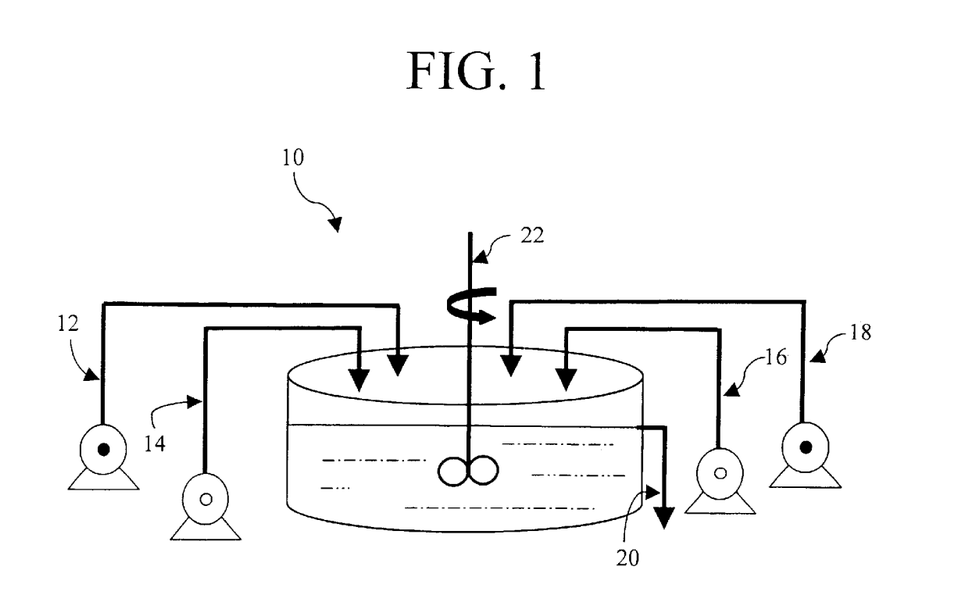
FIG. 1 is a process diagram of a method for making preoxidized positive active material in accordance with the present invention.

Referring now to FIG. 1, generally depicted therein at 10 is a process diagram showing a preferred method for making preoxidized nickel hydroxide material. The method 10 includes forming a nickel hydroxide material in the presence of an oxidizing agent. The conditions of the process are preferably designed to oxidize the particles for a time and temperature suitable for at least partially incorporating oxidized active material within the bulk of the particle. The operating conditions are adjustable and may be modified by one skilled in the art to give preferred preoxidized active material as described above.

As shown, the nickel hydroxide particles are preferably formed and oxidized in a continuous or in-line process. The continuous process includes combining a metal solution 12 containing nickel, with an ammonium ion 14 to form an ammonium metal complex. A hydroxide 16 is added to the ammonium complex. pH and temperature are controlled to gradually precipitate nickel hydroxide. The nickel hydroxide particles are preferably made without a preamine complex or preamine reactor. At least one oxidant 18 is added to the mixture to oxidize the nickel hydroxide as it is gradually grown. Upon reaching a predetermined residence time within the reaction, preoxidized nickel hydroxide particles are decanted and filtered 20. The overall residence time is preferably less than 20 hrs.

The metal solution containing nickel is preferably a metal sulfate solution, "MeSO$_4$". The metal sulfate solution may include one or more modifiers or metals other than nickel. The solutions are fed, mixed, reacted and decanted at a rate suitable for partially oxidizing nickel hydroxide particles as they form. The oxidant is provided at a concentration and rate to preferentially oxidize the particles as they form, thereby permitting the core, bulk and surface to be oxidized a predetermined degree. Suitable oxidizers include chlorates, perchlorates, hypochlorates, hypoclorites, peroxides, permanganates, nitrates, oxygen containing compounds, etc. This list of oxidizers should not be considered limited to the above, but may also include any dehydrogenation reaction in which an e$^-$ is transferred. A most preferred oxidizer is sodium hypochlorate.

Preferred process conditions comprise: combining, MeSO$_4$, NH$_4$OH, NaOH and an oxidant in a single reactor, maintaining the reactor at a constant temperature of 20–100° C. (more preferably 40–80° C. and most preferably 50–70° C.), agitating the combination at a rate of 400–1000 rpm (more preferably 500–900 rpm and most preferably 700–850 rpm), controlling the pH (11) of the agitating combination at a value between 9–13 (more preferably at 10–12 and most preferably at 10.5–12.0) and controlling both the liquid phase and vapor phase ammonia concentration.

The MeSO$_4$ solution may be formulated by mixing 3–30 wt %, more preferably 5–25% and most preferably 7–12% nickel as nickel sulfate with other sulfate solutions containing desired modifier(s). Overall, the metal sulfate solution added to the reactor is 0.05–6 M. The NH$_4$OH solution added to the reactor is 1–15 M, more preferably 5–15 M and most preferably 10–15 M solution. The NaOH solution added to the reactor may be 5–50 wt %, more preferably 8–40 wt % and most preferably a 15–30 wt %.

As stated above, the pH of the mixture in the reactor should be controlled. The control of pH can be accomplished by any appropriate method, preferably through the addition of a base as needed, such as KOH or NaOH. In order to assure optimum contact between the components of the mixture introduced into the reactor, constant mixing or agitation should be provided. Agitation may be provided by any suitable method, such as stirring, agitating, vortexing, ultrasonic, vibration, etc. but should attain the agitation rates as set forth herein above. As shown, agitation is provided by constant stirring 22.

In order to efficiently incorporate non-soluble modifiers into the bulk of the modified nickel hydroxide material, it is preferable that insoluble components are not included in the MeSO$_4$ containing nickel ions, but rather formulated in a separate solution and introduced using a separate feed stream. For example, modifiers like calcium should be formulated using a separate feed stream, such as calcium chloride, calcium nitrate, calcium acetate, etc. The Ca salt solution introduced into the reactor is 0.005–20 wt %, more preferably a 0.005–2.0 wt % and most preferably 0.005–1.0 wt %. A third (or more) feed stream may also be used for other insoluble materials that are desired to be provided in the bulk positive active material.

The present inventors have also found that a CSTR approach vastly simplifies processing and may be accomplished without a preamine complex or preamine reactor. The inventors have realized that the nickel ammonium complex can be formed and destroyed simultaneously, that a short-life nickel ammonium complex is not a problem as normally thought by others. Therefore, under the reactant concentrations described previously, and the reactor conditions of temperature, mixing, pH and constituent concentrations, formation of the nickel ammonia complex and subsequent immediate precipitation to nickel hydroxide can occur simultaneously. The inventors have further recognized that the single reactor CSTR process can be used with a number of advantages, including:

the use of highly concentrated reactant solutions, effectively reducing the amount of effluent streams.

the use of lower pH, thereby extending equipment and process control life and reliability.

eliminating the need to "balance" two reactors, thus enhancing simplicity in processing.

The addition of each component and the removal of the resultant slurry (containing precipitated, preoxidized nickel hydroxide material) is preferably carefully controlled at complimentary rates so that the slurry contains a maximum amount of precipitate and a minimum amount of un-reacted components. Once the slurry is drawn off from the reactor, it is filtered to separate the precipitate from the liquid. The liquid is then recycled and the precipitate processed to produce the modified preoxidized nickel hydroxide of the present invention.

It is therefore possible to produce preoxidized nickel hydroxide materials having one, two, three, four, five or more modifiers without premature precipitation and process failure. Preferred modifiers used to form preoxidized nickel hydroxide materials have Co, and may be characterized by a formula selected from the following:

(NiCoZnMgCa)(OH)$_2$
(NiCoZnMnMgCa)(OH)$_2$
(NiCoZnMgCaCuMn)(OH)$_2$

Total modifiers preferably account for less than 20% of the total metal compound of the nickel material. Co is preferably present at 3 to 9 atomic %, more preferably 4 to 8 atomic %, and most preferably at 5 to 7 atomic % relative to the total metal composition. Zn, Mg and Ca are each preferably less than 2 atomic %. The preoxidized particles preferably have preoxidized Co and may include one or more other preoxidized modifiers.

In the method of the instant invention, great care should be taken with certain processing parameters. For instance, the liquid saturation of ammonia versus its vapor or head space saturation in the reactor is very important. The present inventors have found that the ammonia concentration in the reactor significantly influences the final properties of the resultant powder with respect to crystallinity and tap density. Since ammonium hydroxide is continuously metered into the reactor, but is present in excess, part of the ammonia must be removed via the reactor head-space. The inventors have found that care must be exercised to avoid a "crust" forming on the top of the liquid, that is, to avoid the liquid surface area in the reactor that is exposed to air from inadvertently charring. The inventors also control the incoming and exiting air stream in terms of air flow rate and humidity. For a 100 kg/day reaction vessel, the inventors have determined that an air flow of about 50 or greater ft$^3$/minute is adequate, with a relative humidity below about 65%. Properly managed, the materials of the present invention having the proper density and degree of crystallinity are consistently obtainable in volume production. If, on the other hand, process parameters, such as head-space saturation or concentration of ammonia are ignored, it is more likely than not that poor quality nickel hydroxide material will be produced.

While the invention has been illustrated in detail in the drawings and the foregoing description, the same is to be considered as illustrative and not restrictive in character, it is understood that only the preferred embodiments have been shown and described fully and that all changes and modifications that come within the spirit of the invention are desired to be protected.

What is claimed is:

1. A hydrogen storage battery comprising:
    a negative electrode having an electrochemically active negative material;
    a positive electrode electrochemically coupled with the negative electrode,
        the positive electrode having an electrochemically active positive material with a precharge;
    an excess negative capacity; and
    one or more additives in the battery for providing a precharge in the negative electrode.

2. The hydrogen storage battery of claim 1 wherein said electrochemically active positive material precharge is provided in an amount sufficient to offset any self-charge to the negative electrode after assembly.

3. The hydrogen storage battery of claim 1 wherein the ratio of negative to positive (N/P) is 1.5 or less.

4. The hydrogen storage battery of claim 1 wherein the battery further includes an overcharge reservoir, overdischarge reservoir, and an excess negative capacity; the excess negative capacity being balanced between the overcharge reservoir and the overdischarge reservoir.

5. The hydrogen storage battery of claim 1 wherein the one or more additives are provided in the positive electrode for enhancing conductivity, the oxidation of said additive(s) providing a precharge to the negative electrode.

6. The hydrogen storage battery of claim 1 wherein the positive electrode is non-sintered and the electrochemically active positive material includes a plurality of preoxidized electrochemically active particles.

7. The hydrogen storage battery of claim 6 wherein the positive electrode further includes a plurality of non-oxidized positive active material particles immediately after battery assembly.

8. The hydrogen storage battery of claim 6 wherein each preoxidized particle is partially non-oxidized.

9. The hydrogen storage battery of claim 8 wherein each preoxidized particle is 3% to 75% non-oxidized.

10. The hydrogen storage battery of claim 6 wherein each preoxidized particle has a dispersion of oxidized and non-oxidized positive active material throughout each particle.

11. The hydrogen storage battery of claim 6 wherein each preoxidized particle includes nickel oxyhydroxide material and nickel hydroxide material.

12. The hydrogen storage battery of claim 6 wherein each preoxidized particle has a surface that is greater than 1% non-oxidized.

13. The hydrogen storage battery of claim 6 wherein each preoxidized particle is 1% to 50% oxidized.

14. The hydrogen storage of claim 6 wherein each preoxidized particle is 3% to 35% oxidized.

15. The battery of claim 1 wherein the negative electrode includes an electrochemical hydrogen storage alloy selected from the group consisting of $AB_2$, modified $AB_2$, TiZrVNiCr, or modified TiZrVNiCr materials.

16. The battery of claim 1 wherein the negative electrode includes an electrochemical hydrogen storage alloy selected from the group consisting of $AB_5$, modified $AB_5$, and other $AB_x$ materials.

17. A method for making a nickel metal hydride battery comprising the steps of:
    providing a negative electrode with a negative active material, an overcharge reservoir, an overdischarge reservoir and a precharge;
    providing a positive electrode with a positive active material;
    providing a precharge in the positive electrode prior to normal battery cycling in an amount sufficient to shift some of the negative active material forming the overdischarge reservoir into the overcharge reservoir; and
    electrochemically coupling the negative electrode with the positive electrode in an electrochemically cell.

18. The method of claim 17 wherein the negative electrode has a precharge that is less than the precharge of the positive electrode.

19. The method of claim 17 further including subjecting the battery to electrical formation to substantially balance charge distribution between the negative electrode and the positive electrode.

20. The method of claim 17 further including subjecting the battery to heat formation to substantially balance charge distribution between the negative electrode and the positive electrode.

21. The method of claim 17 wherein the positive electrode is non-sintered.

22. The method of claim 17 further including: forming the positive electrode by the steps including: combining a plurality of partially oxidized active nickel particles with non-oxidized active nickel particles and forming the mixture into a non-sintered electrode.

23. The method of claim 22 wherein the partially oxidized active nickel particles are 3% to 55% oxidized.

24. The method of claim 22 wherein the partially oxidized active nickel particles are 10% to 70% oxidized.

25. The method of claim 22 further including:

providing an electrochemically irreversible additive in the positive electrode to provide the precharge in negative electrode after battery assembly.

26. The method of claim 25 wherein the additive includes: Co and/or CoO.

27. The method of claim 25 wherein the additive includes a non-reversible oxidant with a valence higher than $3^+$ other than nickel or cobalt compounds.

* * * * *